United States Patent
Höhn

(10) Patent No.: US 12,486,568 B2
(45) Date of Patent: Dec. 2, 2025

(54) AlN-BASED HARD MATERIAL LAYER ON BODIES OF METAL, HARD METAL, CERMET OR CERAMICS, AND METHOD FOR THE PRODUCTION THEREOF

(71) Applicant: FRAUNHOFER-GESELLSCHAFT ZUR FÖRDERUNG DER ANGEWANDTEN FORSCHUNG E.V., Munich (DE)

(72) Inventor: Mandy Höhn, Freital / OT Pesterwitz (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 18/282,404

(22) PCT Filed: Mar. 18, 2022

(86) PCT No.: PCT/EP2022/057100
§ 371 (c)(1),
(2) Date: Sep. 15, 2023

(87) PCT Pub. No.: WO2022/195054
PCT Pub. Date: Sep. 22, 2022

(65) Prior Publication Data
US 2024/0158909 A1 May 16, 2024

(30) Foreign Application Priority Data
Mar. 18, 2021 (DE) .................... 10 2021 106 674.3

(51) Int. Cl.
*C23C 16/02* (2006.01)
*B82Y 40/00* (2011.01)
(Continued)

(52) U.S. Cl.
CPC .......... *C23C 16/0272* (2013.01); *B82Y 40/00* (2013.01); *C23C 16/303* (2013.01); *C23C 16/36* (2013.01); *C30B 29/403* (2013.01)

(58) Field of Classification Search
None
See application file for complete search history.

(56) References Cited

U.S. PATENT DOCUMENTS 4,336,305 A 6/1982 Tanaka
2004/0110039 A1* 6/2004 Horling ................. C23C 30/005
428/698

(Continued)

FOREIGN PATENT DOCUMENTS

DE 10 2010 052 687 A1 5/2012
DE 10 2012 004 367 A1 9/2012

(Continued)

OTHER PUBLICATIONS

Yang, et al., "Influence of high power impulse magnetron sputtering pulse parameters on the properties of aluminum nitride coatings", May 27, 2014, Surface & Coatings Technology, vol. 259, pp. 219-231 (Year: 2014).*

(Continued)

*Primary Examiner* — Seth Dumbris
(74) *Attorney, Agent, or Firm* — GREENBLUM & BERNSTEIN, P.L.C.

(57) ABSTRACT

The invention relates to the field of materials engineering and relates to an AlN-based hard material layer on bodies of metal, hard metal, cermet or ceramics and to a method for the production thereof. The aim of the invention is to provide an AlN hard material layer which has improved hardness and wear resistance and can be produced in an inexpensive and time-efficient manner. According to the invention, an AlN-based hard material layer is provided, which is an individual layer or a multi-layered layer system, wherein at (Continued)

Figure 1:
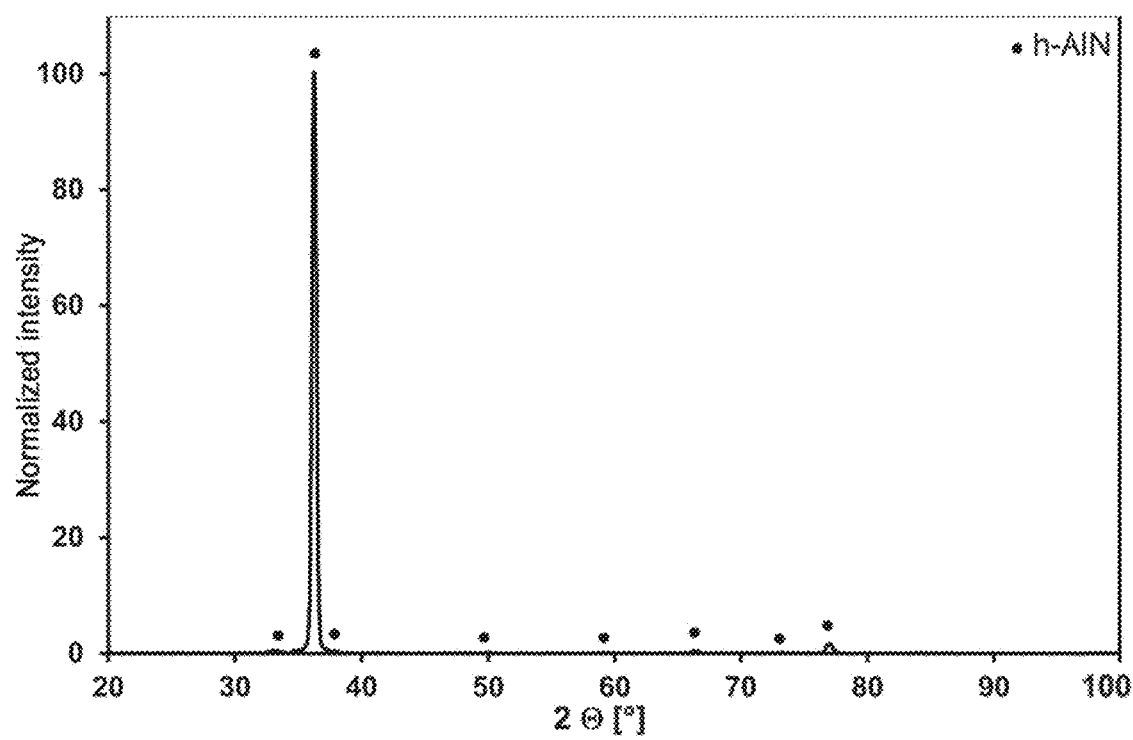

least the one layer or at least one layer of the multi-layered layer system is an AlN-based hard material layer with a hexagonal lattice structure that has a <002> texture and is oxygen-doped, wherein the oxygen doping is in the range of 0.01 at. % to 15 at. %. The hard material layer can be used as a wear-protection layer for cutting tools.

18 Claims, 9 Drawing Sheets

(51) Int. Cl.
  *C23C 16/30* (2006.01)
  *C23C 16/36* (2006.01)
  *C30B 29/40* (2006.01)

(56) References Cited

U.S. PATENT DOCUMENTS

| | | | |
|---|---|---|---|
| 2008/0318069 A1* | 12/2008 | Coddet | C23C 14/027 427/523 |
| 2010/0119315 A1* | 5/2010 | Kathrein | C23C 16/45523 407/119 |
| 2012/0237794 A1* | 9/2012 | Sottke | C22C 29/16 501/153 |
| 2013/0302521 A1 | 11/2013 | Sottke et al. | |
| 2014/0208662 A1 | 7/2014 | Wendt et al. | |
| 2019/0177839 A1* | 6/2019 | Fukunaga | C23C 16/45563 |

FOREIGN PATENT DOCUMENTS

| | | |
|---|---|---|
| DE | 11 2012 003 571 T5 | 6/2014 |
| EP | 0 310 043 A2 | 4/1989 |
| JP | 2001/287104 A1 | 10/2001 |
| JP | 2019/84671 A | 6/2019 |
| WO | 2012/126031 A1 | 9/2012 |

OTHER PUBLICATIONS

Irene et al., "Some Properties of Chemically Vapor Deposited Films of AlxOyNz on Silicon", Journal of Electronic Materials, XP055937900, Internet: URL:https://link.springer.com/article/10.1007/BF02666227 [downloaded: Jul. 4, 2022], Jun. 1, 1975, pp. 409-427.

Signore et al., "Role of oxygen contaminant on the physical properties of sputtered AlN thin films", Journal of Alloys and Compounds, Elsevier Sequoia, Lausanne, CH, XP029266875, ISSN: 0925-8388, DOI: 10.1016/J.JALLCOM.2015.05.2892. Experimental, Jul. 17, 2015, pp. 1267-1272.

Silvestri et al., "Chemical Vapor Deposition of AlxOyNz Films", Journal of Electronic Materials, XP055937897, Internet: URL:https://link.springer.com/article/10.1007/BF02666228 [downloaded Jul. 4, 2022], Jun. 1, 1975, pp. 429-444.

Gasparotto Piero et al., "Mapping the Structure of Oxygen-Doped Wurtzite Aluminum Nitride Coatings from Ab Initio Random Structure Search and Experiments", Applied Materials & Interfaces, vol. 13, Nr. 4, XP055937528, ISSN: 1944-8244, DOI: 10.1021/acsami.0c19270, Internet: URL:https://pubs.acs.org/doi/pdf/10.1021/acsami.0c19270>, Experimental and computational procedure, Jan. 19, 2021, pp. 5762-5771.

Chen et al., "High temperature properties of AlN coatings deposited by chemical vapor deposition for solar central receivers", Surface and Coatings Technology, Elsevier, NL, vol. 377, XP085813058, ISSN: 0257-8972, DOI: 10.1016/J.SURFCOAT.2019.07.083, Aug. 3, 2019.

International Search Report issued in International Patent Application No. PCT/EP2022/057100, dated Jul. 15, 2022, along with an English translation thereof.

Written Opinion of the International Searching Authority issued in International Patent Application No. PCT/EP2022/057100, dated Jul. 15, 2022.

\* cited by examiner

AlN-BASED HARD MATERIAL LAYER ON BODIES OF METAL, HARD METAL, CERMET OR CERAMICS, AND METHOD FOR THE PRODUCTION THEREOF

The present invention relates to the technical field of materials technology and relates to an AlN-based hardcoat layer on bodies made of metal, cemented carbide, cermet or ceramic, and to a process for production thereof. The AlN-based hardcoat layer of the invention is highly textured and oxygen-doped and may be used, for example, as antiwear layers for cutting tools, as protective layers for turbine blades or as diffusion barriers in microelectronics.

The prior art discloses AlON layers that are used predominantly as dielectric layers and for resistive memory in microelectronics. The layers are produced here by a wide variety of different CVD (thermal CVD, RTP-MOCVD) and PVD methods.

JP 2001 287 104 A1 discloses a coating composed of one or more layers containing aluminum oxynitride. Each of the aluminum oxynitride layers consists of a solid Al—O—N solution, a crystalline Al—O—N compound or a mixture of the two. In addition, AlN may be mixed therewith.

DE 10 2010 052 687 A1 discloses a multilayer oxynitride layer system comprising cubic AlN and AlON on substrates such as preferably HSS and cemented carbide. What is disclosed here is a layer structure consisting of multiple layers, including an oxynitride layer, preferably composed of the elements Cr, Al, O and N with a layer thickness between 0.3 and 2.5 micrometers.

U.S. Pat. No. 4,336,305 A1 discloses a ceramic indexable cutting insert, on the surface of which has been disposed a thin coating of at least one layer of $Al_2O_3$ or AlON by CVD methods.

WO 2012 126 031 A1 discloses a combination of a TiAlN layer with a second layer consisting of AlON and optionally carbon, where Al may be partly replaced by another metal.

A disadvantage of the solutions known from the prior art is that the hardness and wear resistance of the AlN hardcoat layers produced are inadequate. AlN-based hardcoat layers according to the prior art show a hardness of around 2000 HV. A further disadvantage is that the production of such AlN-based hardcoat layers is time-consuming and costly.

The problem addressed is that of providing an AlN hardcoat layer having improved hardness and wear resistance. Another problem addressed by the invention is that of providing a time- and cost-efficient thermal CVD process for producing AlN hardcoat layers.

The problems are solved by the features of the claims, and the invention also includes combinations of the individual dependent claims in the sense of an AND linkage, provided that they are not mutually exclusive.

The problem is solved in accordance with the invention by an AlN-based hardcoat layer on bodies made of metal, cemented carbide, cermet or ceramic, which is an individual layer produced by CVD methods without plasma excitation or a multilayer system, wherein at least the one layer or at least one layer of the multilayer system is an AlN-based hardcoat layer with hexagonal lattice structure having a <002> texture which is oxygen-doped, where the oxygen doping is within a range from 0.01 at % to 15 at % without direct lattice binding in the hexagonal structure.

Advantageously, the texture has a texture coefficient TC of >2.5 to 8.

Also advantageously, the texture is in columnar form.

Advantageously, the AlN-based hexagonal hardcoat layer has a proportion of Al content of ≥45 at %.

Further advantageously, the h-AlN-based hardcoat layer has a layer thickness between 5 and 40 µm.

In an advantageous configuration of the invention, at least one h-AlN-based hardcoat layer is in nanocrystalline form, where the crystallite size is particularly advantageously 5 nm to 100 nm.

In addition, particularly advantageously, the nanocrystalline h-AlN-based hardcoat layer may have amorphous components, where there is very particularly advantageously oxygen doping of 0.01 at % to 25 at %.

Advantageously, at least one h-AlN-based hardcoat layer has a hardness of 2500 HV [0.01] to 2800 HV [0.01].

In addition, it may advantageously be the case that the h-AlN-based hardcoat layer has doping by Zr, Si, Hf, Ta and/or Ti.

In an advantageous configuration, there is at least one tie layer, interlayer and/or outer layer, which particularly advantageously consist(s) of nitrides, carbides, carbonitrides, oxycarbides, oxycarbonitrides of the elements of transition groups 4-6 of the PTE or of oxides of Al or Zr. Very particularly advantageously, the tie layer, interlayer and/or outer layer is TiN, TiCN, TiAlN and/or combinations thereof.

The invention also provides a process for producing a AlN-based hardcoat layer on bodies made of metal, cemented carbide, cermet or ceramic, in which a textured, oxygen-doped h-AlN-based hardcoat layer is deposited by means of a thermal CVD method without plasma excitation in a CVD reactor from a gas phase composed of $AlCl_3$, $H_2$, $N_2$, $NH_3$, CO and/or $CO_2$ and at temperatures between 850° C. and 1050° C. and at pressures between 0.1 kPa and 30 kPa, with supply of CO and/or $CO_2$ separately to the CVD reactor via a separate gas supply.

Advantageously, $NH_3$ is supplied separately to the CVD reactor for production of the gas phase, and a gas phase comprising 0.2% by volume to 2% by volume of CO and/or $CO_2$ is particularly advantageously deposited.

Likewise advantageously, an AlN-based hardcoat layer is deposited from a gas phase with 0.30% by volume to 2% by volume of $NH_3$.

In an advantageous configuration of the process, the deposition of the h-AlN-based hardcoat layer is preceded by deposition of at least one tie layer, interlayer and/or outer layer composed of nitrides, carbides, carbonitrides, oxycarbides, oxycarbonitrides of the elements of transition groups 4-6 of the PTE or of oxides of Al or Zr, which is very particularly advantageously deposited as a tie layer, interlayer and/or outer layer comprising TiN, TiCN, TiAlN and/or combinations thereof.

The invention provides an oxygen-doped, textured h-AlN-based hardcoat layer that has been produced in a time- and cost-efficient manner by a thermal CVD process without plasma excitation and has improved hardness and wear resistance.

The invention provides pure AlN-based hardcoat layers that always have a texture of a hexagonal lattice structure formed in <002> direction. In order to obtain the hexagonal lattice structure of the AlN hardcoat layer, it is proposed that CO and/or $CO_2$ be introduced into the CVD coating chamber selectively and separately via separate gas feeds specifically by a CVD method without plasma excitation, in order thus to dope oxygen into the hexagonal lattice structure and incorporate it there selectively. Direct lattice binding of the oxygen does not take place here. Contrary to the prior art, the h-AlN-based hardcoat layer thus does not have oxygen contents attributable to impurities and leaks in the CVD reactor, but rather controlled oxygen doping that influences the morphological properties without direct lattice binding exclusively at interstitial lattice sites.

As a result, a novel highly textured, oxygen-doped h-AlN hardcoat layer is provided, which has a high hardness of up to 2800 HV [0.01] and high wear resistance. Surprisingly, the selective incorporation of a specific proportion of oxygen in the deposition of the layer has a positive effect on the structure and properties of the h-AlN-based hardcoat layer of the invention.

This is achieved in that the AlN-based hardcoat layer with hexagonal lattice structure is provided and produced, which has a texture and contains oxygen doping in the range from 0.01 at % to 15 at %, and hence has high hardness and excellent wear resistance.

A texture in the context of the invention shall be understood to mean a crystallographic orientation of the crystallites of the oxygen-doped h-AlN-based hardcoat layer which has grown on the substrate by virtue of the CVD method of the invention without plasma excitation. This texture is advantageously in columnar form, with each column having essentially hexagonal and hence honeycomb-like form.

The columnar formation of the texture of the oxygen-doped, highly textured h-AlN-based hardcoat layer creates intrinsic stresses by virtue of the direct contact of the adjacent columns within the AlN-based hardcoat layer of the invention, which lead to tension in the hardcoat layer and hence to a significant improvement in hardness and wear resistance.

According to the invention, at least one layer of an oxygen-doped AlN-based layer system has a hexagonal lattice structure having a <002> texture.

The inventive texture of the individual layer(s) can be expressed by a texture coefficient TC.

This texture coefficient TC is calculated by the following formula according to JCPDS 0-25-1133:

$$TC_{(hkl)} = \frac{I_{(hkl)}/I_{0(hkl)}}{\frac{1}{n}\sum I_{(hkl)}/I_{0(hkl)}}$$

The following 8 lattice planes are used for the calculation: <100>, <002>, <101>, <102>, <110>, <103>, <200>, <112>.

The TC of the oxygen-doped h-AlN-based hardcoat layer that has been highly textured in accordance with the invention is advantageously >2.5 to 8.

The solution of the invention provides a novel oxygen-doped h-AlN-based hardcoat layer on bodies made of metal, cemented carbide, cermet or ceramic, wherein the h-AlN-based hardcoat layer is a single layer or a multilayer system.

In a multilayer system, at least one h-AlN-based hardcoat layer of the layer system may be in nanocrystalline form. The nanocrystalline layer is in particularly fine-grain form and has a crystallite size of 5 nm to 100 nm. Such a nanocrystalline AlN-based hardcoat layer may additionally have amorphous components and advantageously oxygen doping of 0.01 at % to 25 at %.

It is particularly advantageous when there are one or more tie layers, interlayers and/or outer layers between the body to be coated and oxygen-doped h-AlN-based hardcoat layer of the invention. The prior deposition of one or more tie layers, interlayers and/or outer layers can especially achieve significantly better adhesion of the oxygen-doped h-AlN-based hardcoat layer of the invention on the body made of metal, cemented carbide, cermet or ceramic.

The deposition of one or more interlayers between the tie layer and outer layer achieves improved hardness of the overall layer system and especially of the tie layer.

The applying of one or more outer layers enables a further increase in oxidation resistance and improved binding of the h-AlN-based hardcoat layer subsequently disposed thereon. This additionally achieves the effect that friction between the highly textured, oxygen-doped h-AlN-based hardcoat layer and the material to be processed is reduced, which achieves, for example, a significantly improved service life of the antiwear layer. Advantageously, the tie layers, interlayers or outer layers consist of nitrides, carbides, carbonitrides, oxycarbides, oxycarbonitrides of the elements of transition groups 4-6 of the PTE or of oxides of Al or Zr.

Particularly advantageously, the tie layers, interlayers and/or outer layers may be composed of TiN, TiCN, TiAlN and/or combinations thereof. For good adhesion on the body to be coated, for example, the tie layer may consist of TiN. For improvement of the hardness, there may be an interlayer, for example composed of TiCN, which is deposited atop the tie layer. In addition, for further improvement in the adhesion of the h-AlN-based hardcoat layer of the invention, an additional outer layer of TiN may be provided atop the interlayer.

The inventive hexagonal lattice structure of the AlN-based hardcoat layer and the controlled use of CO and/or $CO_2$ as additional oxygen source in the CVD coating apparatus in combination with the texture of the invention achieves particularly high hardness values of 2500 HV [0.01] to 2800 HV [0.01] with high element contents of Al of 45 at %. A maximum element content of Al increases oxidation resistance and hence has positive effect on wear resistance, especially at high temperatures.

It is advantageous when the h-AlN-based hardcoat layer has additional doping by Zr, Si, Hf, Ta and/or Ti. The introduction of small amounts of Zr, Si, Hf, Ta and/or Ti introduces extrinsic atoms into the hexagonal lattice structure and hence improves the hardness and wear resistance of the h-AlN-based hardcoat layer.

The improved wear properties of the h-AlN-based hardcoat layer of the invention with texture and oxygen doping are achieved by a thermal CVD method without plasma excitation, in that this layer is deposited in a CVD reactor a gas phase composed of $AlCl_3$, $H_2$, $N_2$ and $NH_3$ with selective addition of CO and/or $CO_2$, at temperatures between 850° C. and 1050° C. and at pressures between 0.1 kPa and 30 kPa.

It has been found to be advantageous when the reactive gas phase required for the coating is mixed only within the CVD reactor, where it is deposited directly on the substrate.

For provision of the gas phase in the CVD reactor, it is advantageous when $NH_3$ is conducted into the reactor chamber via separate gas supply devices.

The separate supply of the constituents of the gas phase has the advantage that the gas phase at the moment of deposition in the reactor has significantly higher reactivity, and hence the risk of premature reaction in the gas supply device is reduced. Moreover, the separate supply of the reaction gases to the CVD reactor can adjust the composition of the gas phase individually and in a simple manner and especially control the supply of $NH_3$, $CO_2$ and/or CO.

It has likewise been found, to be advantageous when a gas phase with 0.2% by volume to 2.0% by volume of CO and/or $CO_2$ is deposited. The selective addition of CO and/or $CO_2$ leads to specific intercalation of oxygen into the AlN-based hardcoat layer without direct lattice binding into the hexagonal lattice structure. This especially leads to improved oxidation resistance of the h-AlN-based hardcoat layer.

Advantageously, the gas phase may additionally have doping by Zr, Si, Hf, Ta and/or Ti, which are incorporated into the hexagonal lattice structure of the h-AlN-based hardcoat layer during the deposition of the hardcoat layer.

It has been found that, surprisingly, significant texturing with a high texture coefficient TC of >2.5 to 8 is achieved when the gas phase to be deposited has a proportion of $NH_3$ of 0.3% by volume to 2.0% by volume.

In the composition of the invention, a novel highly textured, oxygen-doped h-AlN-based hardcoat layer is provided, which has a high hardness up to 2800 HV [0.01] and high wear resistance. Surprisingly, the selective incorporation of a specific proportion of oxygen in the deposition of the layer has a positive effect on the structure and properties of the h-AlN-based hardcoat layer of the invention. The novel LPCVD process permits the production of the layers in the temperature range of 850° C.-1050° C.

Figure 2:
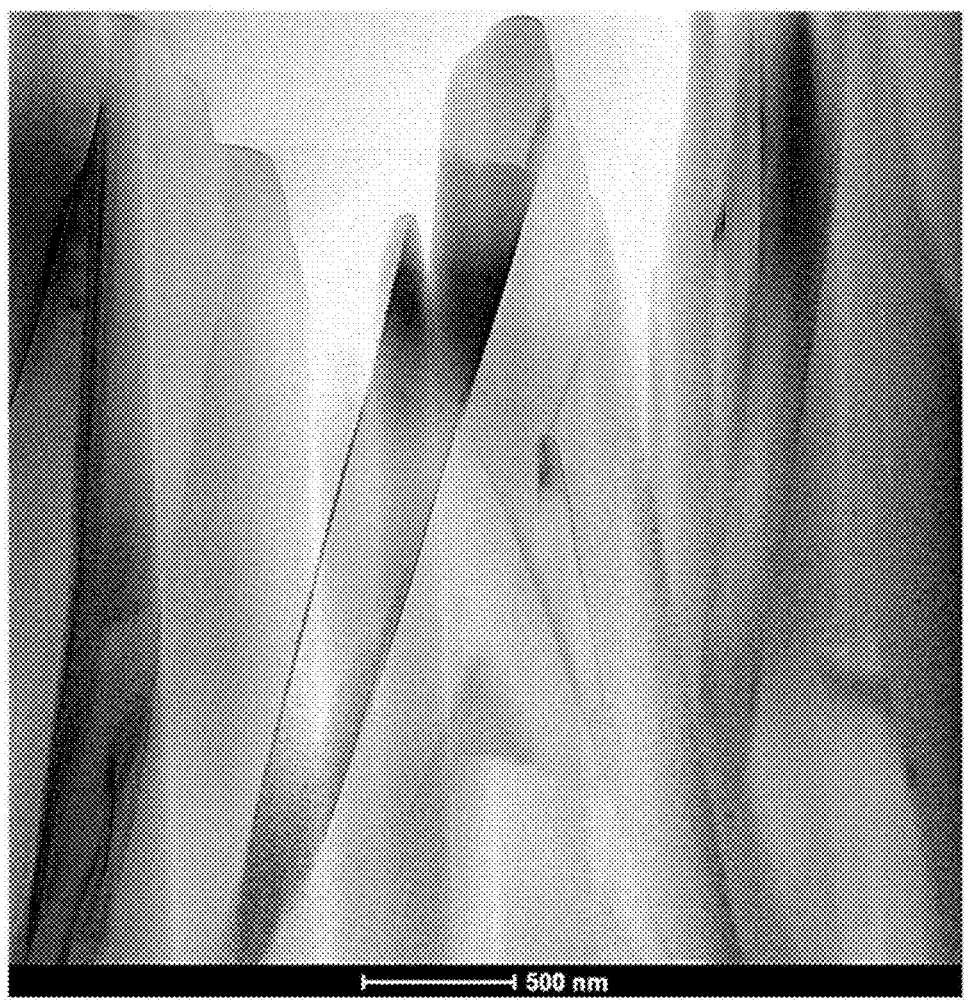

The invention is elucidated in detail below by multiple working examples and the corresponding figures. The figures show:

FIG. 1: x-ray diffractogram of the highly textured, oxygen-doped h-AlN layer produced by CVD according to Example 1, FIG. 2: TEM image of the highly textured, oxygen-doped h-AlN-based hardcoat layer according to Example 1

Figure 3:
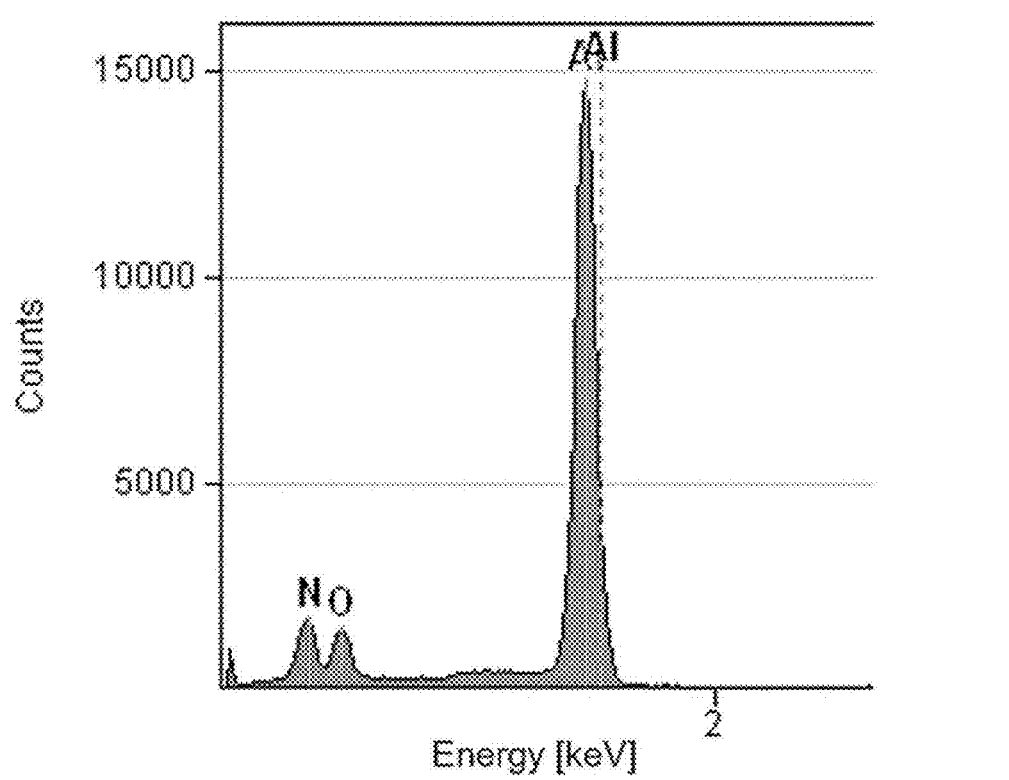

FIG. 3: TEM-EDX analysis of the highly textured, oxygen-doped h-AlN-based hardcoat layer according to Example 1

Figure 4:
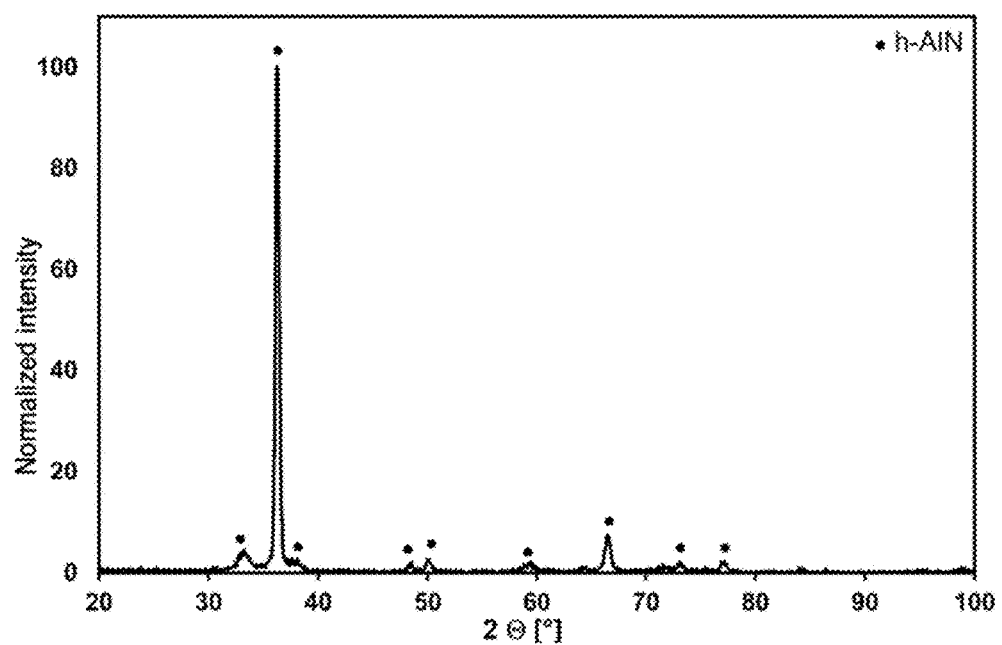
Figure 5:
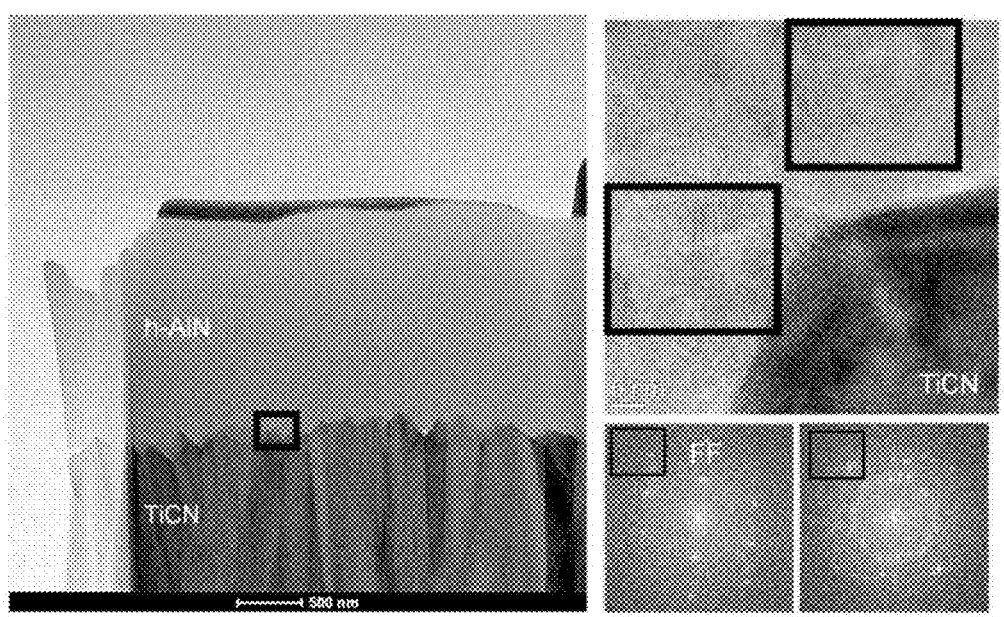

FIG. 4: x-ray diffractogram of the highly textured, oxygen-doped h-AlN-based hardcoat layer Example 2 produced by CVD FIG. 5: TEM image of the highly textured, oxygen-doped h-AlN-based hardcoat layer according to Example 2

Figure 6:
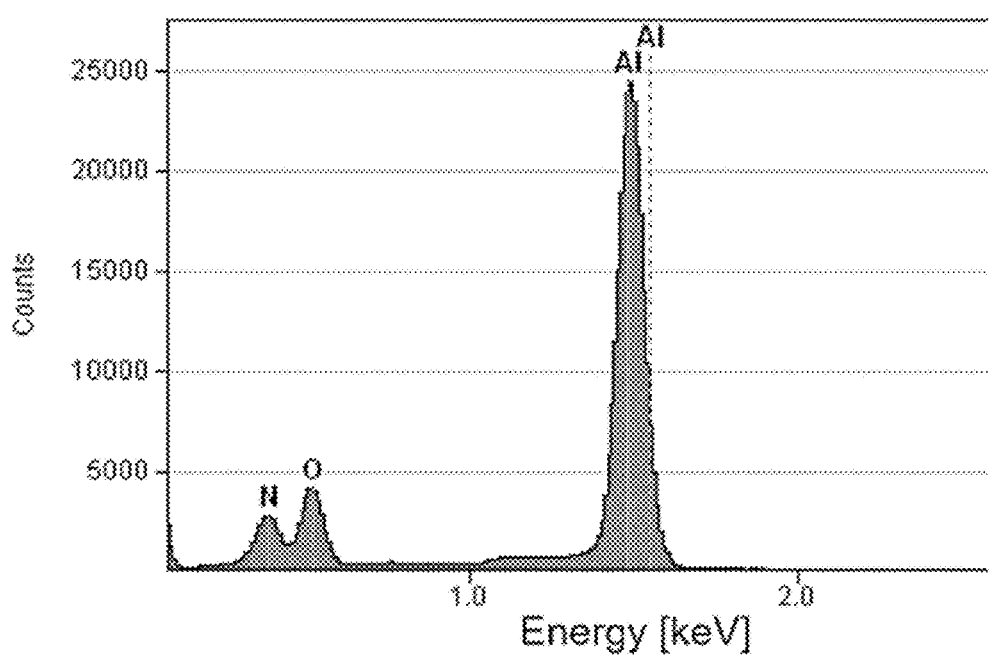

FIG. 6: TEM-EDX analysis of the highly textured, oxygen-doped h-AlN-based hardcoat layer according to Example 2

Figure 7:
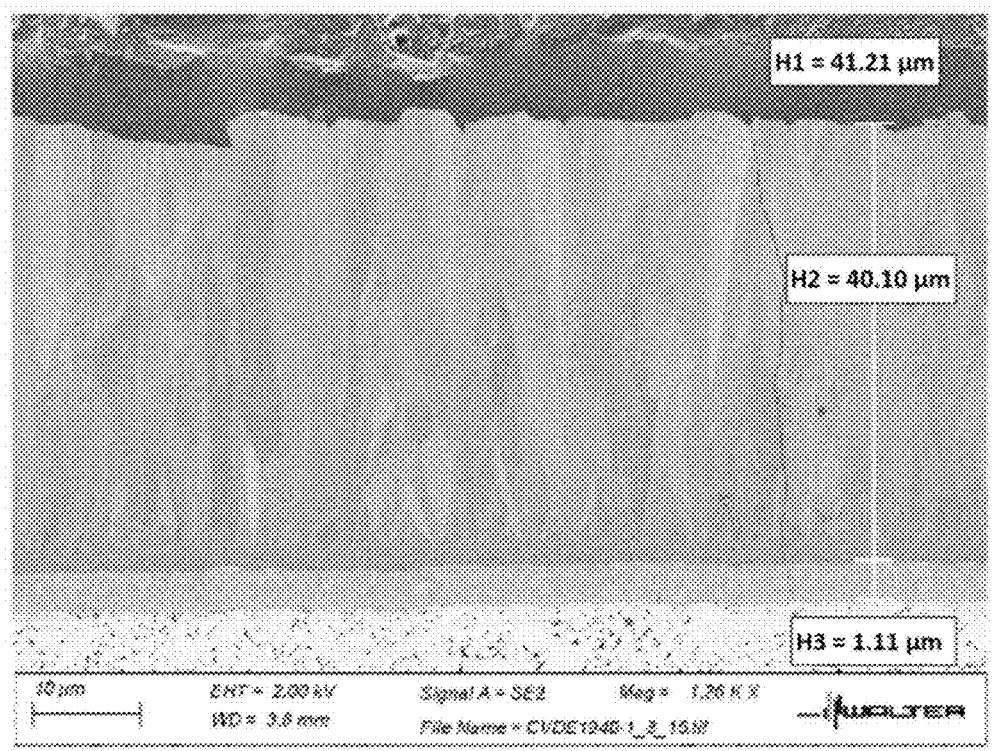

FIG. 7: SEM polished section image of a 40 μm-thick highly textured, oxygen-doped h-AlN-based hardcoat layer according to Example 3

Figure 8:
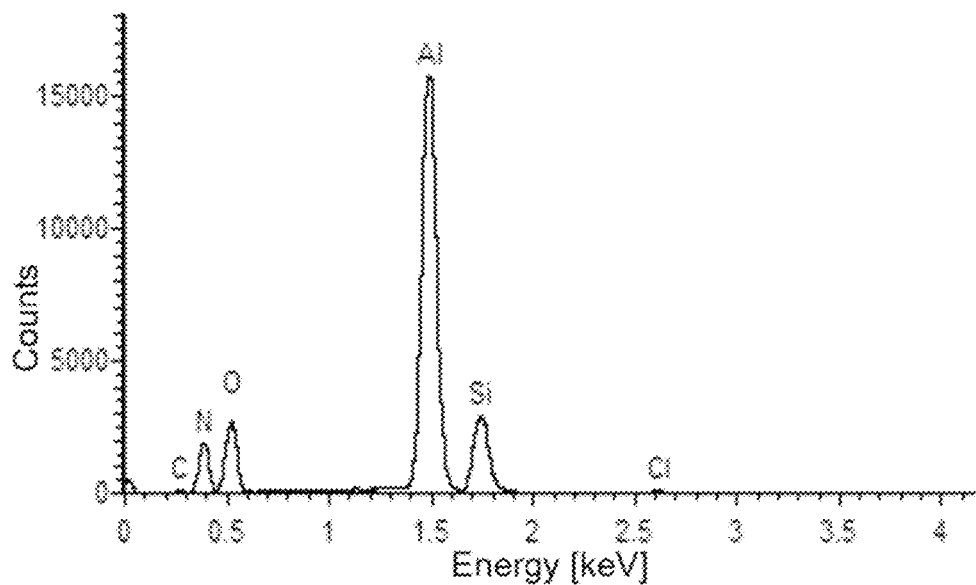

FIG. 8: EDX analysis of the highly textured, oxygen-doped h-AlN-based hardcoat layer, doped with silicon, produced by CVD according to Example 4

Figure 9:
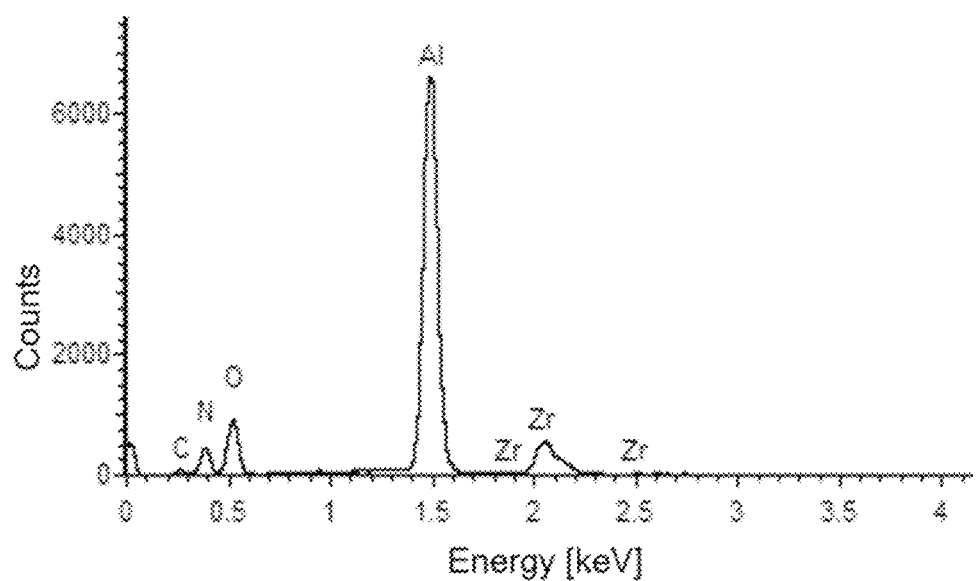

FIG. 9: EDX analysis of the highly textured, oxygen-doped h-AlN-based hardcoat layer, doped with zirconium, produced by CVD according to Example 5

Figure 10:
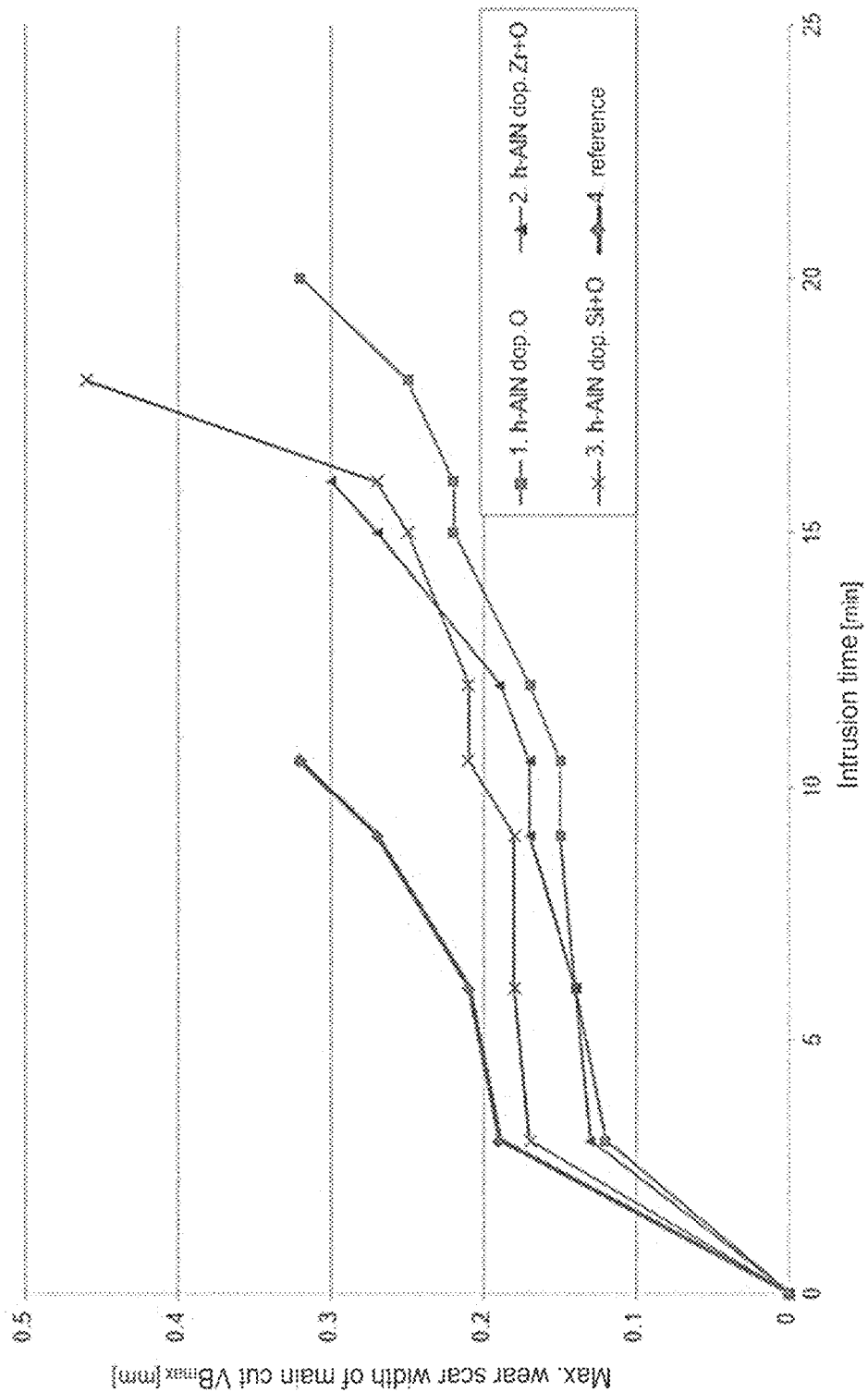

FIG. 10: wear test on a highly textured, oxygen-doped h-AlN-based hardcoat layer according to Example 1, 4 and 5

EXAMPLE 1

A highly textured and oxygen-doped h-AlN-based hardcoat layer is deposited by a thermal CVD method without plasma excitation as outer layer on WC/Co cemented carbide indexable cutting inserts that have been precoated with a 5 μm-thick TiN/TiCN/TiN layer system as tie layer, interlayer and outer layer. The coating process is conducted in a hot-wall CVD reactor having an internal diameter of 75 mm. The CVD coating is effected with a gas phase composed of 0.46% by volume of $AlCl_3$, 0.31% by volume of $NH_3$, 0.72% by volume of $CO_2$, 4.80% by volume of $N_2$ and 93.71% by volume of $H_2$, The deposition temperature is 900° C. and the process pressure is 6 kPa. After a coating time of 90 min, a 5.2 μm-thick highly textured and oxygen-doped h-AlN-based hardcoat layer is obtained.

In the x-ray crystallography layer analysis conducted, an h-AlN phase is detected, the crystallites of which have grown in highly textured manner in <002> direction. The texture coefficient TC is 7.2. TEM analyses combined with an elemental analysis according to FIG. 2 and FIG. 3 showed that the h-AlN phase is doped with 13 at % of oxygen. By means of a Vickers indenter, a microhardness of 2690 HV [0.01] was measured.

The elemental analysis in the TEM gave the following element contents:
47 at % Al,
39.5 at % N,
13 at % O,
and 0.5 at % Cl.

EXAMPLE 2

A highly textured and oxygen-doped h-AlN-based hardcoat layer, which is nanocrystalline with amorphous components, is deposited by a thermal CVD method as outer layer on WC/Co cemented carbide indexable cutting inserts that have been precoated with a 5 μm-thick TiN/TiCN/TiN layer system as tie layer, interlayer and outer layer. The coating process is conducted in a hot-wall CVD reactor having an internal diameter of 75 mm. The CVD coating is effected with a gas phase composed of 0.46% by volume of $AlCl_3$, 0.42% by volume of $NH_3$, 0.61% by volume of $CO_2$, 4.68% by volume of $N_2$ and 93.83% by volume of $H_2$. The deposition temperature is 850° C. and the process pressure is 6 kPa. After a coating time of 90 min, a 6.0 μm-thick highly textured and oxygen-doped h-AlN-based hardcoat layer is obtained, which is in nanocrystalline form with amorphous components.

In the x-ray crystallography layer analysis conducted, by means of the x-ray diffractogram according to FIG. 4, an h-AlN phase is detected, the crystallites of which have grown in highly textured manner in <002> direction. The texture coefficient TC is 4.2. TEM analyses combined with an elemental analysis according to FIG. 5 and FIG. 6 showed that the h-AlN phase has been doped with 24 at % of oxygen. By means of a Vickers indenter, a microhardness of 2580 HV [0.01] was measured.

The elemental analysis in the TEM gave the following element contents:
45 at % Al,
30.5 at % N,
24 at % O,
and 0.5 at % Cl.

EXAMPLE 3

A highly textured, oxygen-doped h-AlN-based hardcoat layer is deposited by a thermal CVD method as outer layer on WC/Co cemented carbide indexable cutting inserts that have been precoated with a 1 μm-thick TiN tie layer. The coating process is conducted in a hot-wall CVD reactor having an internal diameter of 75 mm. The CVD coating is effected with a gas phase composed of 0.46% by volume of $AlCl_3$, 0.45% by volume of $NH_3$, 0.58% by volume of $CO_2$, 4.80% by volume of $N_2$ and 93.71% by volume of $H_2$. The deposition temperature is 1000° C. and the process pressure is 6 kPa. After a coating time of 150 min, a 40.0 μm-thick highly textured and oxygen-doped h-AlN-based hardcoat layer is obtained.

In the x-ray crystallography layer analysis conducted, an h-AlN phase is detected, the crystallites of which have grown in highly textured manner in <002> direction. The texture coefficient TC is 5.4. The SEM analysis of the polished section according to FIG. 7 shows a 40 μm-thick highly textured h-AlN-based hardcoat layer, By means of a Vickers indenter, a microhardness of 2760 HV [0.01] was measured.

EXAMPLE 4

A highly textured and oxygen-doped h-AlN-based hardcoat layer doped with silicon is deposited by a thermal CVD method as outer layer on WC/Co cemented carbide indexable cutting inserts that have been precoated with a 5 µm-thick TiN/TiCN/TiN layer system as tie layer, interlayer and/or outer layer. The coating process is conducted in a hot-wall CVD reactor having an internal diameter of 75 mm. The CVD coating is effected with a gas phase composed of 0.46% by volume of $AlCl_3$, 0.06% by volume $SiCl_4$, 0.31% by volume of $NH_3$, 0.72% by volume of $CO_2$, 4.80% by volume of $N_2$ and 93.65% by volume of $H_2$. The deposition temperature is 900° C. and the process pressure is 6 kPa. After a coating time of 90 min, a 4.8 µm-thick highly textured and oxygen-doped h-AlN-based hardcoat layer doped with silicon is obtained.

In the x-ray crystallography layer analysis conducted, an h-AlN phase is detected, the crystallites of which have grown in highly textured manner in <002> direction. The texture coefficient TC is 3.7. According to FIG. 8, the EDX analysis of the polished section shows doping of the highly textured h-AlN layer with oxygen and silicon. By means of a Vickers indenter, a microhardness of 2610 HV [0.01] was measured.

EXAMPLE 5

A highly textured and oxygen-doped h-AlN-based hardcoat layer doped with zirconium is deposited by a thermal CVD method as outer layer on WC/Co cemented carbide indexable cutting inserts that have been precoated with a 5 µm-thick TiN/TiCN/TiN layer system as tie layer, interlayer and outer layer. The coating process is conducted in a hot-wall CVD reactor having an internal diameter of 75 mm. The CVD coating is effected with a gas phase composed of 0.46% by volume of $AlCl_3$, 0.04% by volume $ZrCl_4$, 0.31% by volume of $NH_3$, 0.72% by volume of $CO_2$, 4.80% by volume of $N_2$ and 93.67% by volume of $H_2$. The deposition temperature is 1030° C. and the process pressure is 6 kPa. After a coating time of 90 min, a 4.5 µm-thick highly textured and oxygen-doped h-AlN-based hardcoat layer doped with zirconium is obtained.

In the x-ray crystallography layer analysis conducted, an h-AlN phase is detected, the crystallites of which have grown in highly textured manner in <002> direction. The texture coefficient TC is 4.1. According to FIG. 9, the EDX analysis of the polished section shows doping of the highly textured h-AlN-based hardcoat layer with oxygen and zirconium. By means of a Vickers indenter, a microhardness of 2650 HV [0.01] was measured.

The invention claimed is:

1. An AlN-based hardcoat layer on bodies made of metal, cemented carbide, cermet or ceramic, which is an individual layer produced by CVD methods without plasma excitation or a multilayer system, wherein
at least the one layer or at least one layer of the multilayer system is a hexagonal-AlN-based hard material layer with hexagonal lattice structure having a <002> texture which is oxygen-doped, where the oxygen doping is within a range from 0.01 at % to 15 at % without direct lattice binding in the hexagonal lattice structure, and the Al content of the hexagonal-AlN-based hard material layer is ≥45 at %.

2. The hardcoat layer as claimed in claim 1, in which the texture has a texture coefficient TC of >2.5 to 8.

3. The hardcoat layer as claimed in claim 1, in which the texture is in columnar form.

4. The hardcoat layer as claimed in claim 1, in which the hexagonal-AlN-based hard material layer has a layer thickness between 5 and 40 µm.

5. The hardcoat layer as claimed in claim 1, in which the multilayer system is present, and the hexagonal-AlN-based hard material layer is nanocrystalline.

6. The hardcoat layer as claimed in claim 5, in which the crystallite size is 5 nm to 100 nm.

7. The hardcoat layer as claimed in claim 5, in which the multilayer system includes the nanocrystalline hexagonal-AlN-based hard material layer and amorphous portions.

8. An AlN-based hard material coating on bodies made of metal, cemented carbide, cermet or ceramic, the AlN-based hard material coating being a multilayer system that has amorphous portions and at least one layer produced by CVD methods without plasma excitation; wherein
the at least one layer produced by CVD methods without plasma excitation of the multilayer system is an oxygen-doped hexagonal-AlN-based hard material layer with hexagonal lattice structure having a <002> texture, where the oxygen doping of the oxygen-doped hexagonal-AlN-based hard material layer is within a range from 0.01 at % to 15 at %, and the oxygen doping is present without direct lattice binding to the hexagonal lattice structure of the oxygen-doped hexagonal-AlN-based hard material layer,
a total oxygen doping of the multilayer system of the AlN-based hard material is from 0.01 at % to 25 at %,
the Al content of the oxygen-doped hexagonal-AlN-based hard material layer is ≥45 at %, and
the oxygen-doped hexagonal-AlN-based hard material layer is nanocrystalline.

9. The hardcoat layer as claimed in claim 1, in which the hexagonal-AlN-based hard material layer further comprises doping by Zr, Si, Hf, Ta and/or Ti.

10. The hardcoat layer as claimed in claim 1, in which the hexagonal-AlN-based hard material layer has a hardness of 2500 HV [0.01] to 2800 HV [0.01].

11. The hardcoat layer as claimed in claim 1, in which there is at least one tie layer, interlayer and/or outer layer.

12. The hardcoat layer as claimed in claim 11, in which the tie layer, interlayer and/or outer layer consist(s) of nitrides, carbides, carbonitrides, oxycarbides, oxycarbonitrides of the elements of transition groups 4-6 of the periodic table of the elements or of oxides of Al or Zr.

13. The hardcoat layer as claimed in claim 11, in which the tie layer, interlayer and/or outer layer is TiN, TiCN, TiAlN and/or combinations thereof.

14. A process for producing an AlN-based hardcoat layer on bodies according to claim 1, said bodies made of metal, cemented carbide, cermet or ceramic, in which a textured, oxygen-doped hexagonal-AlN-based hard material layer is deposited by means of a thermal CVD method without plasma excitation in a CVD reactor from a gas phase composed of $AlCl_3$, $H_2$, $N_2$, $NH_3$, CO and/or $CO_2$ and at temperatures between 850° C. and 1050° C. and at pressures between 0.1 kPa and 30 kPa, with supply of CO and/or $CO_2$ separately to the CVD reactor via a separate gas supply.

15. The process as claimed in claim 14, in which $NH_3$ is supplied separately via a separate gas supply to the CVD reactor for production of the gas phase.

16. The process as claimed in claim 14, in which a gas phase with 0.30% by volume to 2% by volume of $NH_3$ is used.

17. The process as claimed in claim 14, in which the deposition of the hexagonal-AlN-based hard material layer is preceded by deposition of at least one tie layer, interlayer and/or outer layer composed of nitrides, carbides, carbonitrides, oxycarbides, oxycarbonitrides of the elements of transition groups 4-6 of the PTE periodic table of the elements or of oxides of Al or Zr.

18. The process as claimed in claim 17, in which a tie layer, interlayer and/or outer layer comprising TiN, TiCN, TiAlN and/or combinations thereof is deposited.

\* \* \* \* \*